Patented July 23, 1929.

1,721,522

UNITED STATES PATENT OFFICE.

HERMANN HOFER-MASSARD, OF LAUSANNE, SWITZERLAND.

ALMOND MILK COMPOSITION.

No Drawing. Application filed December 5, 1927, Serial No. 237,992, and in Switzerland December 10, 1926.

The present invention relates to the productions of an almond milk composition remaining imperishable in hermetically closed receptacles for an unlimited time and which when mixed with water remains homogeneous without the ingredients separating out, characterized in that grated almonds are intimately mixed with fresh full cream milk, whereupon the mixture is pressed out, the liquid obtained in this manner being slowly concentrated and sterilized by heat with or without the addition of sugar as may be found necessary and drawn off into hermetically closed containers.

The invention may be carried out as explained in the following example:

Grated almonds are intimately mixed with fresh full cream milk, for instance in the proportion of 1:6, and pressed out. The fat containing juice obtained in this way from the almonds, the so-called almond milk, becomes intimately mixed with milk. The liquid product obtained is then, preferably with the addition of sugar and under moderate heat, evaporated to about half the volume and thus perfectly sterilized during the condensation, which has a duration of about 1½ hours, so that all ferment is destroyed.

The product so obtained is drawn off into hermetically closed containers and is imperishable for an unlimited time. After opening of the containers the product therein maintains its absolute freshness and excellent taste for two or three weeks.

Due to the slow condensation, not only sterilization takes place but a homogeneous and imperishable product is obtained which may be mixed with cold or hot water in any proportion without resulting in the decomposing or separating out of the ingredients. The most essential parts, as for instance the fat, the albuminous substances, as well as the salts contained in the full cream milk and in the almond milk are not changed and remain easily assimilable.

The almond milk syrup may be used for making a nourishing, excellent, digestion improving and refreshing drink. It may be added with spirits such as whisky, brandy and so on. It may also be used for the quick making of a favorite dessert, the so-called "blanc-mange", in creams and the like.

When partaking the product manufactured in accordance with the process above described, i. e. when mixing with water, the almond milk syrup maintains its characteristics just as in the fresh condition and maintains its perfectly homogeneous condition without the separation of the fatty substances.

The almond milk composition may also be prepared without addition of sugar. In this case it may be used, mixed or not with water, as a cosmetic product for beautifying the skin.

I claim:

1. A method of producing an almond milk composition which comprises intimately mixing grated almonds with full cream milk, pressing out the mixture, concentrating the liquid thus obtained to substantially one half its volume, and drawing off the resulting syrup.

2. A method of producing an almond milk composition which comprises intimately mixing grated almonds with full cream milk, pressing out the mixture, adding sugar to the liquid thus obtained, concentrating the liquid over moderate heat to substantially one half its volume, and drawing off the resulting syrup.

3. A method of producing an almond milk composition which comprises intimately mixing one part of grated almonds with six parts of full cream milk, pressing out the mixture, subjecting the liquid thus obtained to moderate heat for about one and one half hours, and drawing off the resulting syrup.

4. An almond milk composition constituting a concentrated syrup comprising a completely sterilized and homogeneous mixture of full cream milk and the liquid constituents of almonds, said syrup being adapted to be mixed with water without causing separation of its ingredients.

In testimony whereof I affix my signature.

HERMANN HOFER-MASSARD.